United States Patent
Deprun et al.

(10) Patent No.: US 7,922,091 B2
(45) Date of Patent: Apr. 12, 2011

(54) METHOD AND APPARATUS FOR PROTOCOL SELECTION ON ICC

(75) Inventors: Jean-François Deprun, Paris (FR); Paul Jolivet, Juvisy sur Orge (FR)

(73) Assignee: LG Electronics Inc., Seoul (KR)

( * ) Notice: Subject to any disclaimer, the term of this patent is extended or adjusted under 35 U.S.C. 154(b) by 1141 days.

(21) Appl. No.: 11/594,850

(22) Filed: Nov. 9, 2006

(65) Prior Publication Data

US 2007/0210174 A1    Sep. 13, 2007

Related U.S. Application Data

(60) Provisional application No. 60/780,855, filed on Mar. 10, 2006.

(51) Int. Cl.
*G06K 19/06* (2006.01)
(52) U.S. Cl. ......................... 235/492; 235/491
(58) Field of Classification Search .................. 235/492, 235/491, 449, 472.01, 472.02, 472.03, 486, 235/487
See application file for complete search history.

(56) References Cited

U.S. PATENT DOCUMENTS

| | | | |
|---|---|---|---|
| 6,840,454 B1 | 1/2005 | Rhelimi | |
| 7,237,049 B2 * | 6/2007 | Kang et al. | 710/104 |
| 7,359,695 B2 * | 4/2008 | Ganzera et al. | 455/343.2 |
| 2005/0086434 A1 | 4/2005 | Kang et al. | |
| 2005/0097237 A1 | 5/2005 | Ruping et al. | |
| 2006/0194622 A1 * | 8/2006 | Ganzera et al. | 455/574 |
| 2007/0210174 A1 * | 9/2007 | Deprun et al. | 235/492 |

FOREIGN PATENT DOCUMENTS

| | | |
|---|---|---|
| DE | 19523275 C1 | 12/1996 |
| EP | 0347894 A2 | 12/1989 |
| WO | WO 99/49415 A2 | 9/1999 |

* cited by examiner

*Primary Examiner* — Thien M Le
(74) *Attorney, Agent, or Firm* — Birch, Stewart, Kolasch & Birch, LLP

(57) ABSTRACT

The present invention provides a solution for supporting both the MMC and USB protocol modes to provide enhanced services and applications in a UICC. The UICC, methods and the terminal for dynamically selecting a protocol on the UICC card are disclosed. The invention provides that at least MMC and USB can be operated in the UICC without multiplexing or implementing a heavy procedure in the terminal. With the present invention, the UICC can be used in any host implementing either USB or MMC without having to add any new negotiation phase.

22 Claims, 5 Drawing Sheets

| # | Assignment | # | Assignment |
|---|---|---|---|
| C1 | VCC | C5 | GND |
| C2 | RST | C6 | VPP |
| C3 | CLK | C7 | I/O |
| C4 | | C8 | |

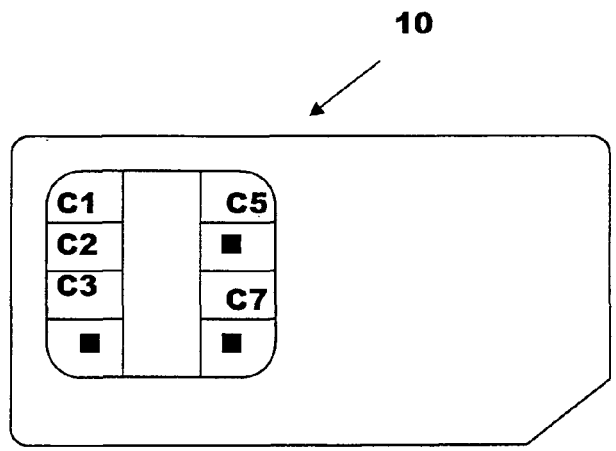
Figure 2 : UICC contact allocation for MMC
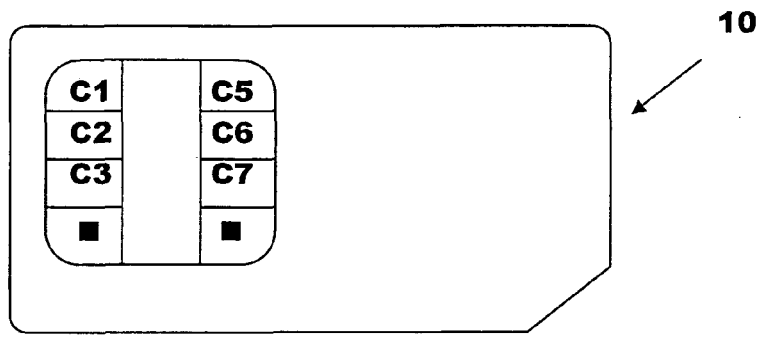
Figure 3 : UICC contact allocation for USB

METHOD AND APPARATUS FOR PROTOCOL SELECTION ON ICC

This Nonprovisional application claims priority under 35 U.S.C. §119(e) on U.S. Provisional Application No. 60/780,855 filed on Mar. 10, 2006, the entire contents of which are hereby incorporated by reference.

BACKGROUND OF THE INVENTION

1. Field of the Invention

The present invention relates to a smart card (SC) or an integrated circuit (IC) card which may be based on a standard such as Universal Integrated Circuit Card (UICC) or the like or has compatibility with those standards; and more particularly relates to a mobile communications terminal that may accommodate the IC card.

2. Background of the Invention

An integrated circuit (IC) card has an embedded integrated circuit (IC) that may be a logic circuit and be typically coupled to physical interfaces that which allow the IC card to communicate with hosts or external devices to perform various functions. The external devices may include a mobile communications terminal, a personal computer, an IC card adapter-writer/reader, a digital camera, a digital portable multimedia player, and so on.

Most IC cards or UICC are likely to support, in addition to a historical International Standard Organization (ISO) protocol (specified in ISO 7816 standards), a high speed protocol that is based on only one of MultiMediaCard (MMC), USB protocol for InterChip use (USBIC) and Universal Serial Bus (USB).

When the UICC or IC card is engaged with the SC writer/reader or the external device, which may have an IC card interface, and connected to a computer via a high speed protocol interface such as the USB standard, the UICC then configures itself with the USB protocol to communicate with the computer and provide a user with a low-cost, high-speed serial interface that can be easy to use and support a "plug and play" function to the devices external to the computer.

However, the conventional IC cards cannot be used in hosts or the external devices that do not adopt the same protocol mode. For example, the IC card operating in the MMC protocol mode cannot directly communicate with the personal computer when the computer does not have an interface and the communication protocol for the IC card including the MMC mode of a flash memory.

As the size of portable devices is getting smaller and thinner, it may be highly desirable to use a single IC card device that can operate in multiple protocol modes instead of utilizing an individual card for each different protocol mode or implementing an additional hardware to accommodate the operation of the terminal in the multi protocol modes.

Currently no implementation may be developed for the UICC to operate in both USB and MMC without multiplexing or implementing a heavy procedure in the mobile communications terminal. Moreover, any specific procedure to be implemented in the terminal (or PC) restricts the market to the only new terminals implementing the specific procedure.

The physical interface between UICC and mobile terminal is based on an eight contacts module. It is very much unlikely that more contacts can be implemented. Therefore, all extensions have to be considered based on: the existing contacts; a minimum backward compatibility: a session can be always opened on ISO T=0 protocol as defined in ISO 7816 series. In addition, the issue is that the number of electrical contacts available on the UICC or IC card is typically limited to eight.

As the functions and capabilities of wireless communications devices continue to develop, increasing the total number of electrical contacts may be one way to support such developments.

However, adding new physical electrical contacts on the UICC can require the significant modifications for both UICC and any external device that needs to communicate with it.

SUMMARY OF THE INVENTION

One aspect of the present invention pertains to the recognition by the present inventors about the background art problems explained above. Namely, it would be advantageous to maintain the total number of electrical contacts (e.g., eight contacts) of the IC card, but dynamically allocate such limited number of contacts in an appropriate manner in order to accommodate and properly support multiple functions and interfaces, especially to handle high speed data communications.

This invention provides a solution for supporting the MMC, USB and (USB protocol for InterChip use) protocol modes to provide enhanced services and applications in the UICC, whereby the UICC (including applications such as Subscriber Identity Module (SIM), Universal SIM (USIM), IP based MultiMedia Subsystem SIM (ISIM or IMS SIM)) requires new interfaces to be used.

The historical ISO 7816 protocol provides communication channels limited due to the protocol used (T=0 and T=1) that is not designed for high speed communication. Enhanced solutions provide a new interface and protocol for high speed protocol modes.

It is an object of the present invention to provide that the MMC protocol mode may be used when the UICC is inserted in the mobile terminal and the USB protocol mode will be used when the UICC communicates with the computer.

It is a further object of the present invention to provide a card based mechanism that is allowed to detect the type of the card writer/reader and then initiates the session on a detected type of the protocol (i.e., MMC or USB) and all protocol modes are used on the same physical interface.

It is a further object of the present invention to provide an IC card that can determine whether the IC card communicates with a host using a MMC protocol mode or the USB protocol mode, and configuring the IC card in such a protocol.

It is an object of the present invention to provide an UICC comprising a plurality of electrical contacts, a memory to store information, the memory being allowed to communicate with a processor via the plurality of electrical contacts, wherein at least one set of electrical contacts are allowed to be allocated by the processor to support an operation in at least one protocol mode depending on a presence of a certain protocol mode detected by the processor.

It is a further object of the present invention to provide a method of dynamically selecting protocol on an IC card. When the UICC is connected to a host, the method begins detecting a type of a protocol mode of the IC card according to an input signal received from the IC card when a power is supplied to at least one of the host and the IC card, allocating at least one set of a plurality of electrical contacts of the IC card according to the detected type of the protocol mode and operating in the detected type of the protocol mode that corresponds to the host.

With this invention, the UICC can be used in any terminal implementing either USB or MMC without having to add any new negotiation phase.

Additional aspects, advantages, and details of the various aspects of the present invention are included in the following description of exemplary examples thereof.

BRIEF DESCRIPTION OF THE DRAWINGS

FIG. 2 is an explanatory view showing a UICC contact allocation for the MMC protocol mode.

FIG. 3 is an explanatory view showing a UICC contact allocation for the USB protocol mode.

DETAILED DESCRIPTION OF THE INVENTION

As an overview, it is desirable to have the UICC that can be used in any terminal implementing USB or MMC without having to add any new negotiation phase, and that can implement both the protocols and the protocol selection procedure for the best interoperability.

Figure 1:
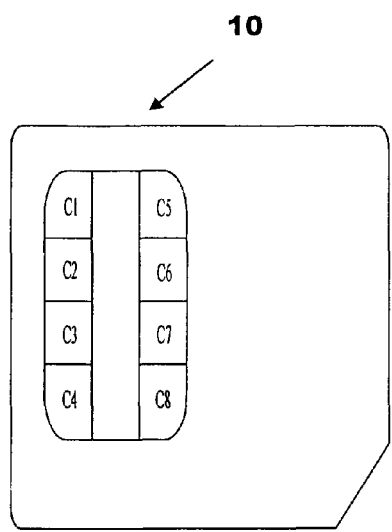
FIG. 1 is an explanatory view showing a UICC and a table of electrical contacts of the UICC according to the present invention.

As illustrated in FIG. 1, the integrated circuit (IC) card 10 can have eight electrical contacts. They are referred to as C1 though C8 as shown in FIG. 1. Here, not all eight electrical contacts may not be electrically engaged with a processor and some of them are unused. These non-used contacts can either be allocated to a specific technology depending on the presence of a specific protocol.

As shown in FIG. 1, five of the electrical contacts may be allocated to a historical ISO protocol (ISO 7816) and three (C4, C6 and C8 available) unused electrical contacts can be available for further developments, such as a UICC contact allocation for MMC or USB.

The definition of each contact of the UICC can be explained as follows:

I/O: Input or Output for serial data to the integrated circuit inside the card.
  VPP: Programming voltage input (defined but not used).
  GND: Ground (reference voltage).
  CLK: Clocking or timing signal.
  RST: Either used itself (reset signal supplied from the interface device) or in combination with an internal reset control circuit (optional use by the card). If the internal reset is implemented, the voltage supply on Vcc is mandatory.
  VCC: Power supply input.
  ETSI SCP TS 102 221 (UICC characteristics) defines a generic platform for an IC card application and specifies the interface between the UICC or IC card and a mobile communications terminal for wireless telecommunications network operations (e.g., 2G, 3G, etc.). It is noted that ETSI represents European Telecommunication Standard Institute, which is in charge of UICC specification. The additional details of the UICC, standards based on ETSI SCP TS102 221(2005-06) or the like are taken into consideration.

In accordance with an embodiment of the present invention, the UICC 10 comprises a plurality of electrical contacts and a memory to store information, the memory being allowed to communicate with a processor via the contacts, wherein at least one set of electrical contacts are allowed to be allocated by the processor to support an operation in the ISO 7816 protocol mode or non-ISO mode depending on a presence of a high speed protocol or contactless protocol detected by a processor. The scope of the present invention is not intended to be limited to any particular elements such as the memory or processor as described above. Moreover, the scope of the present invention may not be limited to any specific kind of IC card or smart card, and other various IC cards or smart cards can be considered to include the essential features of the present invention described here. This invention can apply to any implementation of multiple protocols on the same physical interface of a smart card (rather than the only UICC).

The UICC 10 can be compatible with at least one of a Subscriber Identity Module (SIM) function, a Universal Subscriber Identity Module (USIM) function, and IP based MultiMedia Subsystem SIM (ISIM or IMS SIM) function. However, it is clear that other types of SIM card or similar operations may also be supported by the features of the present invention.

FIG. 2 shows a UICC 10 having its electrical contacts being allocated for the MMC protocol mode. The UICC may comprise a plurality of electrical contacts, a memory to store information (not shown), the memory being allowed to communicate with a processor (not shown) via the plurality of electrical contacts, wherein at least one set of electrical contacts are allowed to be allocated by the processor to support an operation in at least one protocol mode depending on a presence of a certain protocol mode detected by the processor. Here, the plurality of electrical contacts can comprise eight electrical contacts including C1, C2, C3, C4, C5, C6, C7, and C8 contacts in accordance with the International Standard Organization (ISO) 7816 protocol, and C4/C6/C8 contacts can be allocated for implementing the MMC protocol. When the IC card is located at a mobile communications terminal, the mobile terminal can detect and automatically switch to the MMC protocol. When the IC card is inserted in the camera, the camera can detect and automatically switch to the MMC protocol to store data of the camera.

FIG. 3 shows a UICC 10 having its electrical contacts being allocated for the USB protocol mode. In this allocation, the plurality of electrical contacts similarly comprise eight electrical contacts including C1, C2, C3, C4, C5, C6, C7, and C8 contacts as shown in FIGS. 1 and 2, and C4/C8 contacts are allocated for implementing the USB protocol. the IC card is located at a mobile communications terminal, and wherein the mobile terminal supplies 5V current that is detected by the IC card which automatically switches to the USB protocol for connectivity service with an external device.

In addition, C4/C8 contacts can be allocated by the processor for implementing the USB protocol and C6 contact can be allocated by the processor for implementing the contactless communication protocol.

The allocation of electrical contacts of the C4/C6/C8 or C4/C8 have been referred to merely for the sake of explanation of the present invention and the contacts other than these contacts can be used as it would be understood by those skilled in the art. The method of detecting and implementing the type of the protocol mode can be explained later in FIGS. 5-7.

Figure 4:
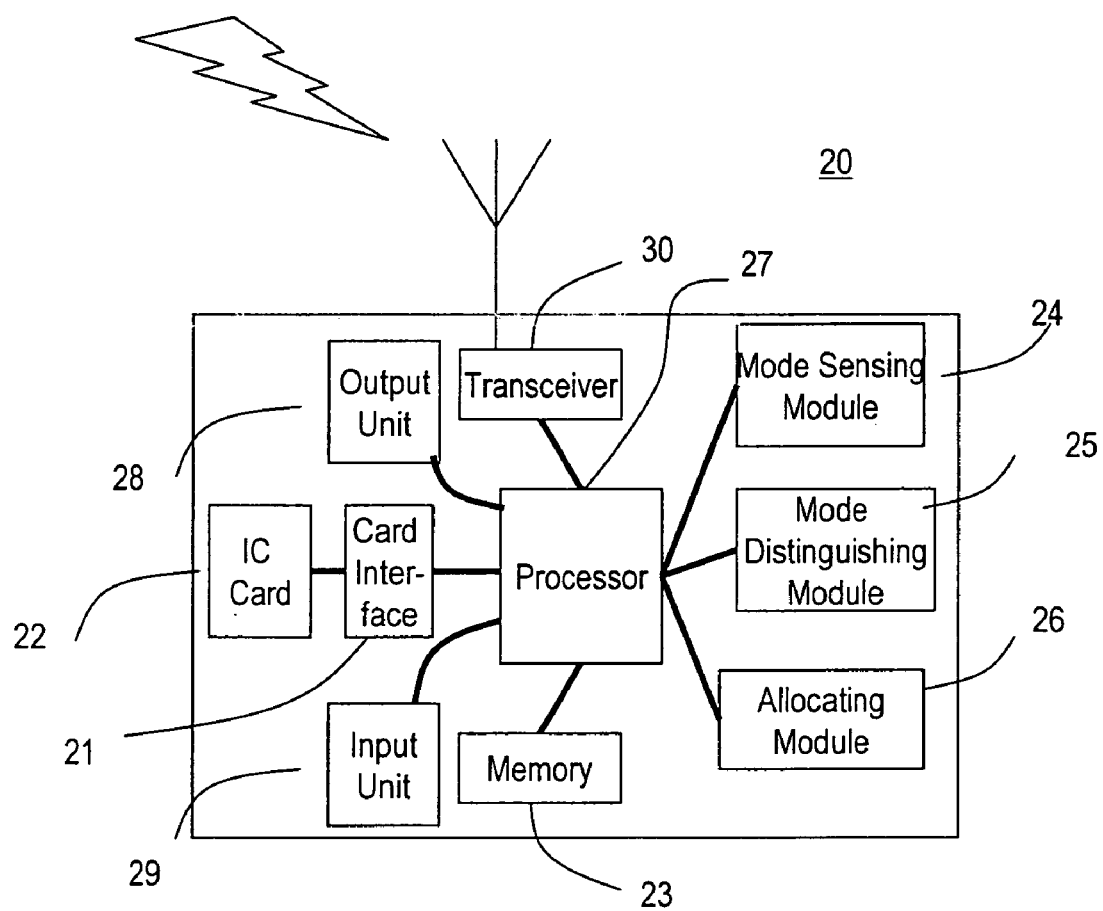
FIG. 4 is an explanatory diagram of the mobile communications terminal including the UICC according to the present invention.

FIG. 4 shows a block diagram of a mobile communications terminal 20 comprising: a physical card interface 21 allowed to be engaged with an IC card or UICC 22; a memory 23 to store information; a mode sensing module 24 accessing the IC card 22 and retrieving information therefrom at a power on of the terminal 20; a mode distinguishing module 25 detecting a presence of the certain protocol mode for the IC card 22; an allocating module 26 allocating at least one set of the plurality of electrical contacts of the IC card 22, and a processor 27. These modules can be part of the processor although FIG. 4 shows them to be separate entities. In addition, the terminal can further comprise a user friendly input unit 28 and output unit 29.

The processor 27 controls the essential operation of the UICC 22 and the mobile terminal 20. The processor 27 is connected to a wireless network via a transceiver 30. The mobile communications terminal 20 may not be limited to comprise the elements described above, but also include many other limitations known in the art which are not shown or described in this.

The processor 27 is located in a mobile communications terminal to implement procedures that are compatible with at least one of a Subscriber Identity Module (SIM) function, a Universal Subscriber Identity Module (USIM) function, and IP based MultiMedia Subsystem SIM (ISIM or IMS SIM) function. The processor 27 can cooperate with the card interface 21, the memory 23, the mode sensing module 24, the mode distinguishing module 25 and the allocating module 26 to detect a type of a protocol mode of the IC card 22 according to an input signal received from the IC card 22 when a power is supplied to at least one of the host and the IC card 22; allocate at least one set of a plurality of electrical contacts of the IC card according to the detected type of the protocol mode; and operate in the detected type of the protocol mode.

The scope of the present invention may include a plurality of wireless networks including WI-FL, WLAN, WIBRO, WIMAX, BREW, 3G networks and the like because certain concepts and features thereof are common to those of the present invention, and thus allow implementation in various types of communications schemes. As related to UICC, this invention is related to the telecommunications area, but the solution may also cover the possible use of the UICC out of this area. The scope of the invention may be related to any specific kind of a mobile terminal or device, including a PDA, a notebook computer, Ultra Portable Mobile Computer (UMPC), and so forth.

A method according to a first embodiment of the present invention will be described while referring to FIG. 5.

Figure 5:
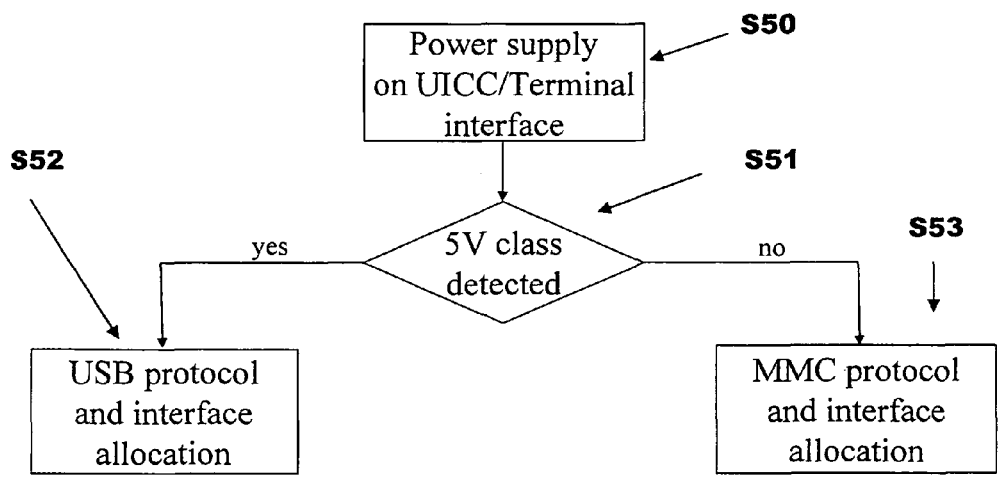
FIG. 5 is a flowchart of a electrical detection of protocol of a first embodiment of a method according to the invention.

As shown in FIG. 5, in the method for dynamically selecting protocol on an IC card, the method begins when the UICC is connected to a host and can detect a type of a protocol mode of the UICC according to an input signal received from the IC card when a power is supplied to at least one of the host and the IC card (S50). Here, detecting the type of the protocol mode according to the input signal can comprise detecting a voltage class supplied to the IC card because the electrical specification of the different protocols are different. For instance, the USB protocol can operate at 5V (as in the personal computer (PC)), whereas the MMC protocol operates at 3V which does not preclude and lower voltage class to be implemented in the future, as for instance 1.8V.

The method then determines if 5V is detected (S51). If the 5V is detected, the USB protocol is enabled on the interface and electrical contacts can be allocated in accordance (C4/C8 for instance allocated to USB as mentioned in FIG. 3) (S52).

If 3V or lower is detected, the MMC protocol can be enabled on the interface and the electrical contacts of the UICC can be allocated in accordance (C4/C6/C8 for instance allocated to MMC as mentioned in FIG. 2) (S53).

Figure 6:
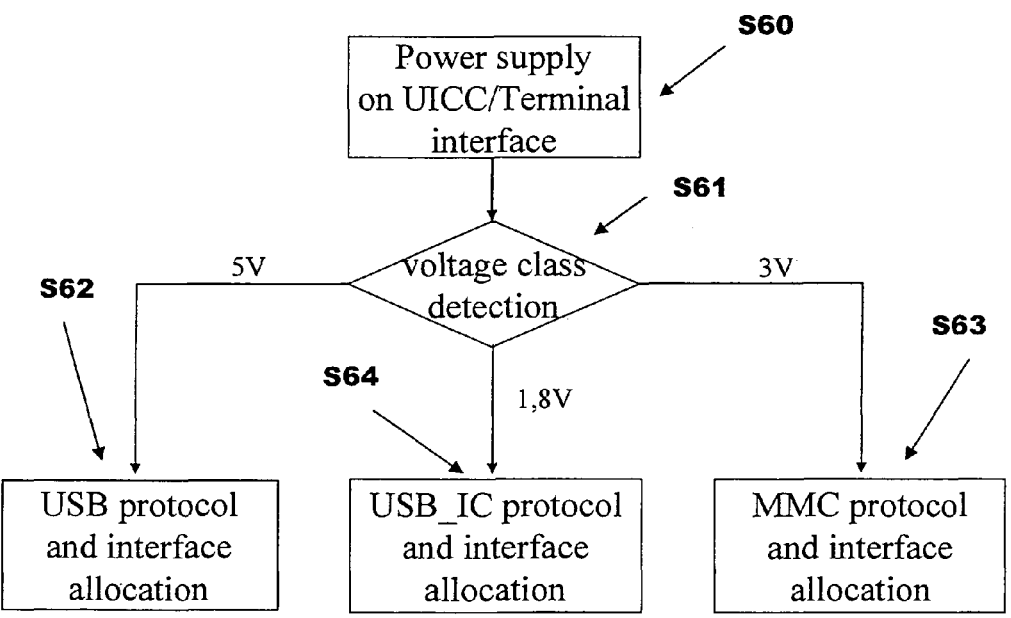
FIG. 6 is a flowchart of a electrical detection of protocol of a second embodiment of a method according to the invention.

FIG. 6 shows a method according to a second embodiment of the present invention. Because the step S60 shown in FIG. 6 can be substantially identical to the step of S50 of the first embodiment of the method as shown in FIG. 5, the detailed explanation of step S60 may not be repeated. Then the method detects the voltage class of the UICC (S61). Here, the method can include the detection of multiple voltage classes allocated to different protocols, for instance, USB (5V), MMC (3V) and USB_IC (USB protocol for InterChip use) (1.8V). It is noted that USB_IC can operate on different voltage classes such as 1.8V, 1.2V or 1.0V.

If the voltage class of 5V is detected, the USB protocol is enabled on the interface and electrical contacts can be allocated in accordance (C4/C8 for instance allocated to USB as mentioned in FIG. 3) (S62).

If the voltage class of 3V is detected, the MMC protocol can be enabled on the interface and the electrical contacts of the UICC can be allocated in accordance (C4/C6/C8 for instance allocated to MMC as mentioned in FIG. 2) (S63).

If the voltage class of 1.8V or lower is detected, the USB_IC protocol can be enabled on the interface and electrical contacts can be allocated in accordance (S64).

Figure 7:
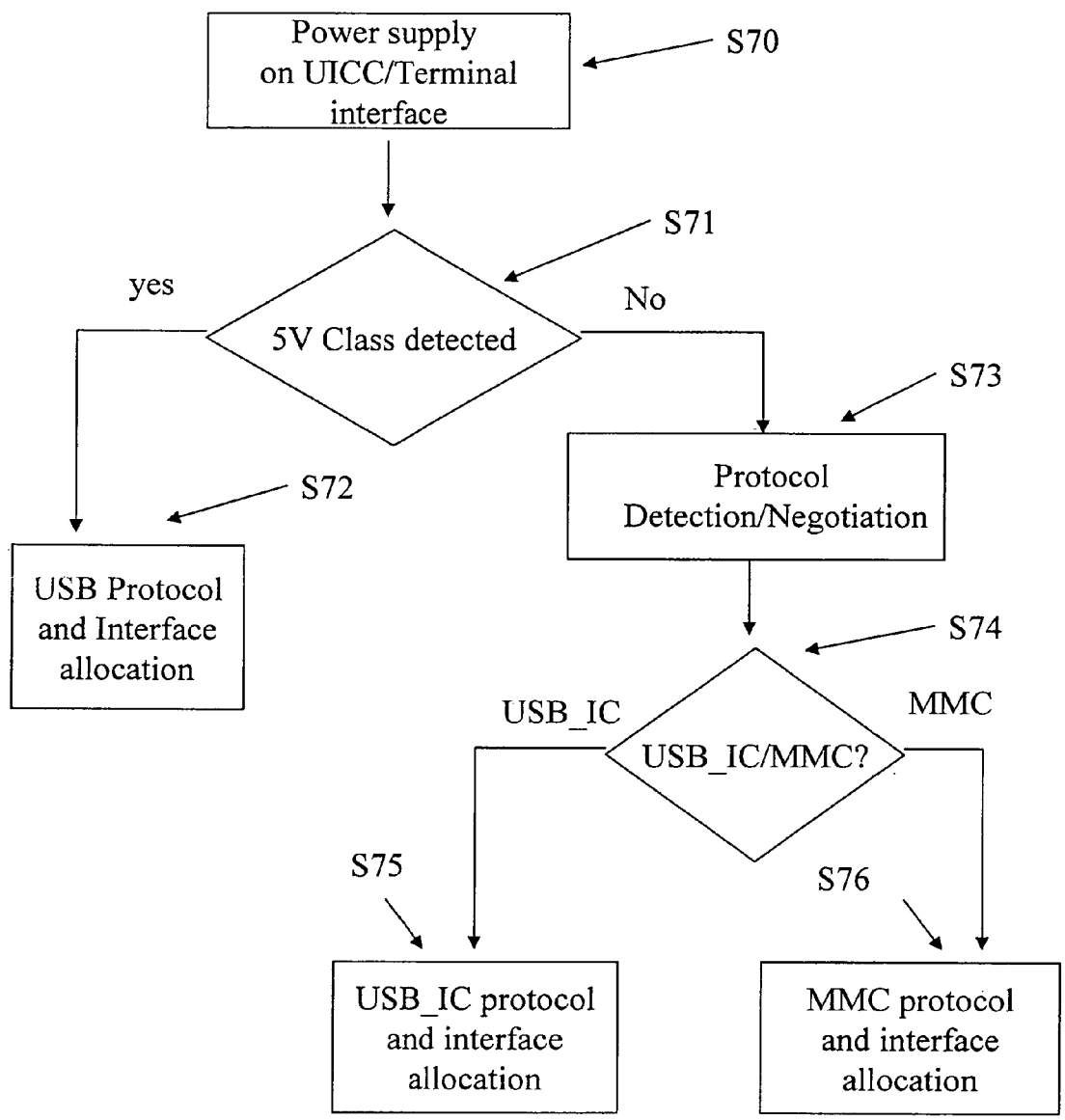
FIG. 7 is a flowchart of a electrical detection of protocol of a third embodiment of a method according to the invention.

FIG. 7 shows a method according to a third embodiment of the present invention including the detection of the protocol mode at the initial phase of session opening (negotiation phase) that is specific to the protocol.

The detailed explanation of steps S70-S71-S72 can be referred to the previously described steps S50-S51-S52 in FIG. 5, respectively, because the steps S70-S71-S72 can be significantly similar to the steps S50-S51-S52 in FIG. 5. Accordingly, the detailed explanation of steps S70-S71-S72 may not be repeated.

The method begins when the UICC is connected to a host and can detect a type of a protocol mode of the UICC according to an input signal received from the IC card when a power is supplied to at least one of the host and the UICC (S70). Then the method begins determines if 5V is detected (S71). If the 5V is detected, the USB protocol is enabled on the interface and electrical contacts can be allocated in accordance (C4/C8 for instance allocated to USB as mentioned in FIG. 3) (S72).

If less than 5 V current is detected, the method begins detecting information regarding the high speed protocol mode at the initial phase opening/negotiation phase that is specific to the protocol (S73). There can be at least two modes of detecting information regarding the high speed protocol mode after initiating a protocol detection/negotiation after the open session (S74).

The first mode of detecting may comprise detecting information regarding the high speed protocol mode included in an Answer To Reset (ATR), which is stored in the UICC, in accordance with the International Standard Organization (ISO) 7816 protocol.

The second mode of detecting a presence of the high speed protocol mode can further comprise detecting a list of enabled protocol modes in a Service Table, which is stored in the IC card, in accordance with ETSI SCP TS 102 221 in the UICC.

If the MMC protocol mode is detected, at least one set of a plurality of electrical contacts of the IC card can be allocated according to the MMC protocol mode and the method operates in the MMC protocol mode (S75). If the USB_IC protocol mode is detected, at least one set of a plurality of electrical contacts of the IC card can be allocated according to the USB_IC protocol mode and the method can proceed to operate in the USB_IC protocol mode (S76).

This method can include the implementation of USB_IC along with the MMC and USB protocol modes. It is noted that the USB_IC can operate on different voltage classes such as 1.8V, 1.2V or 1.0V.

While the present invention described above has been based on the preferred embodiments, the present invention is not limited to the embodiments referred to above. It is noted that various changes can be made thereto without the scope not departing from the general picture thereof.

For example, the UICC can be inserted in a PC (with a USB physical passive adapter). The card is in a slave mode and accessed by PC to read/write files, execute operations, and so forth. At session opening, PC supplies 5V current that is detected by the UICC which proceeds with the operations in USB mode. In addition, the UICC can be inserted in a camera designed with the correct card format reader. The camera provides 3V current, the UICC automatically switches in MMC protocol mode on the interface and the camera can save pictures on the UICC for instance.

For another example, the UICC can be inserted in a mobile communications terminal that requires to use MMC protocol (for instance for mass storage). It then supplies an input signal at 3V and the UICC automatically switches to MMC protocol on the interface. Similarly, the UICC can be inserted in a mobile communications terminal that requires to use USB protocol (for instance for connectivity service). It then supplies an input signal at 5V and the UICC automatically can switch to USB protocol on the interface. Another example of the application of the present invention can be described when the UICC is inserted in a mobile terminal that requires to use both a contactless protocol (on one wire implementation) and the high speed protocol. The mobile terminal can selectively choose to use USB for high speed protocol (enabled on C4/C8 electrical contacts) and contactless protocol (enabled on the C6 contact). If the input signal is supplied at 5V, the UICC can automatically switch to USB protocol on the interface with the C6 electrical contacts being freed for using the contactless protocol.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An integrated circuit (IC) card configured to communicate with a mobile terminal having a processor, comprising:
   a plurality of electrical contacts;
   a memory to store information, the memory being configured to communicate with the processor via the plurality of electrical contacts,
   wherein at least one set of electrical contacts are configured to be allocated by the processor to support an operation in at least one protocol mode depending on a presence of a high speed protocol mode detected by the processor,
   wherein the processor is configured to detect the presence of the certain protocol mode by detecting a voltage level when the IC card is powered on,
   wherein the IC card is configured to automatically switch from a first high speed protocol to a second high speed protocol depending on the voltage level detected when the IC card is powered on,
   wherein the high speed protocol mode comprises a MultiMedia Card (MMC), Universal Serial Bus (USB), and Universal InterChip (USB_IC), and
   wherein the processor is configured to identify the presence of the high speed protocol mode by detecting a type of an IC card reader and initiate a session on a chosen protocol mode.

2. The IC card of claim 1, wherein at least one set of electrical contacts is allocated in accordance with an International Standard Organization (ISO) 7816 protocol and at least one contact is allocated for the USB protocol if 5V is detected.

3. The IC card of claim 2, wherein the plurality of electrical contacts comprise eight electrical contacts including C1, C2, C3, C4, C5, C6, C7, and C8 contacts in accordance with an International Standard Organization (ISO) 7816 protocol, and C4/C8 contacts are allocated for implementing the USB protocol.

4. The IC card of claim 1, wherein at least one electrical contact is allocated for the MMC protocol if 3V or lower is detected.

5. The IC card of claim 4, wherein the plurality of electrical contacts comprise eight electrical contacts including C1, C2, C3, C4, C5, C6, C7, and C8 contacts in accordance with an International Standard Organization (ISO) 7816 protocol, and C4/C6/C8 contacts are allocated for implementing the MMC protocol.

6. The IC card of claim 1, wherein the at least one electrical contact is allocated for the USB_IC if 1.8V or lower is detected.

7. The IC card of claim 1, wherein the IC card is configured to be compatible with at least one of the group comprising a Subscriber Identity Module (SIM) function, a Universal Subscriber Identity Module (USIM) function, and IP based MultiMedia Subsystem SIM (ISIM or IMS SIM) function.

8. The IC card of claim 1, wherein the processor is configured to implement procedures that are compatible with at least one of group comprising a Subscriber Identity Module (SIM) function, a Universal Subscriber Identity Module (USIM) function, and IP based MultiMedia Subsystem SIM (ISIM or IMS SIM) function.

9. The IC card of claim 1, wherein the IC card is in a slave mode and accessed by a computer to read/write data and execute operations when the IC card is inserted in the computer, and wherein at opening session, the computer supplies 5V current that is detected by the IC card which proceeds with the operation in USB mode.

10. The IC card of claim 1, wherein the IC card is accessed by a camera designed with a corresponding high speed protocol format reader when the IC card is inserted in the camera, and wherein the camera supplies 3V current that is detected by the IC card which automatically switches to the MMC protocol to store data of the camera.

11. The IC card of claim 1, wherein the IC card is located at a mobile communications terminal, and wherein the mobile terminal supplies 3V current that is detected by the IC card which automatically switches to the MMC protocol for mass storage.

12. The IC card of claim 1, wherein the IC card is located at a mobile communications terminal, and wherein the mobile terminal supplies 5V current that is detected by the IC card which automatically switches to the USB protocol for connectivity service with an external device.

13. The IC card of claim 12, wherein the mobile terminal is configured to support the operation in the high speed protocol mode and a contactless protocol mode simultaneously.

14. The IC card of claim 13, wherein the plurality of contacts comprise eight electrical contacts including C1, C2, C3, C4, C5, C6, C7, and C8 contacts in accordance with an International Standard Organization (ISO) 7816 protocol, and C4/C8 contacts are allocated by the processor for implementing the USB protocol and C6 contact is allocated by the processor for implementing the contactless communication protocol.

15. A method of dynamically selecting protocol on an IC card arranged in a mobile terminal having a processor, comprising:
- upon connecting the IC card to the mobile terminal, detecting a type of a high speed protocol mode of the IC card by detecting a voltage level supplied to the IC card when a power is supplied to at least one of the mobile terminal and the IC card;
- allocating at least one set of a plurality of electrical contacts of the IC card according to the detected type of the high speed protocol mode;
- operating in the detected type of the high speed protocol mode; and
- automatically switching from a first high speed protocol mode to a second high speed protocol mode depending on the voltage level detected when the IC card is powered on,
- wherein the high speed protocol mode comprises a MultiMedia Card (MMC), Universal Serial Bus (USB), and Universal InterChip (USB_IC).

16. The method of claim 15, further comprising:
- allocating at least one electrical contact for the USB protocol if 5V is detected;
- allocating at least one electrical contact for the MMC protocol if 3V or lower is detected; and
- allocating at least one electrical contact for the USB_IC if 1.8V or lower is detected.

17. The method of claim 15, further comprising:
- determining whether 5V current is supplied to the IC card;
- allocating the at least one set of a plurality of electrical contacts of the IC card according to the USB protocol mode and operating in the USB protocol mode if the 5V current is supplied.

18. The method of claim 17, further comprising:
- if the less than 5V current is supplied to the IC card, detecting information regarding the high speed protocol mode included in an Answer To Reset (ATR), which is stored in the IC card, in accordance with an International Standard Organization (ISO) 7816 protocol at an initial phase of session opening of the mobile terminal;
- if the MMC protocol mode is detected, allocating the at least one set of a plurality of electrical contacts of the IC card according to the MMC protocol mode and operating in the MMC protocol mode; and
- if the USB_IC protocol mode is detected, allocating the at least one set of a plurality of electrical contacts of the IC card according to the USB_IC protocol mode and operating in the USB_IC protocol mode.

19. The method of claim 17, further comprising:
- if the less than 5V current is supplied to the IC card, detecting a list of enabled protocol modes in a Service Table, which is stored in the IC card, in accordance with ETSI SCP TS 102 221 in the IC card, the list comprising information regarding the high speed protocol mode at power on of the mobile terminal;
- if the MMC protocol mode is detected, allocating the at least one set of a plurality of electrical contacts of the IC card according to the MMC protocol mode and operating in the MMC protocol mode; and
- if the USB_IC protocol mode is detected, allocating the at least one set of a plurality of electrical contacts of the IC card according to the USB_IC protocol mode and operating in the USB_IC protocol mode.

20. A mobile communications terminal, comprising:
- a physical interface configured to be engaged with a Subscriber Identity Module (SIM);
- a memory to store information;
- an allocating module configured to allocate at least one set of the plurality of electrical contacts of the SIM; and
- a processor configured to cooperate with the physical interface, the memory and the allocating module to perform the following method:
  - detecting a type of a protocol mode of the SIM by detecting a voltage level supplied to the SIM when a power is supplied to the mobile terminal;
  - allocating at least one set of a plurality of electrical contacts of the SIM according to the detected type of protocol mode; and
  - operating in the detected type of the protocol mode,
- wherein the protocol mode comprises at least one of a high speed protocol mode and a contactless protocol mode, and the processor is configured to implement procedures that are compatible with at least one of the group comprising a Subscriber Identity Module (SIM) function, a Universal Subscriber Identity Module (USIM) function, and IP based MultiMedia Subsystem SIM (ISIM or IMS SIM) function.

21. The terminal of claim 20, wherein the at least one set of electrical contacts allocated for ISO 7816 protocol is disabled when the high speed protocol mode is present and used, and wherein the at least one set of electrical contacts allocated for the ISO 7816 protocol is reallocated for the contactless protocol mode.

22. An integrated circuit (IC) card configured to communicate with a mobile terminal having a processor, comprising:
- a plurality of electrical contacts;
- a memory to store information, the memory being configured to communicate with the processor via the plurality of electrical contacts,
- wherein at least one set of electrical contacts are configured to be allocated by the processor to support an operation in at least one protocol mode depending on a presence of a high speed protocol mode detected by the processor,
- wherein the processor is configured to detect the presence of the certain protocol mode by detecting a voltage level when the IC card is powered on,
- wherein the IC card is configured to automatically switch from a first high speed protocol to a second high speed protocol depending on the voltage level detected when the IC card is powered on, and
- wherein one of the processor and the IC card is configured to be compatible with at least one of the group comprising a Subscriber Identity Module (SIM) function, a Universal Subscriber Identity Module (USIM) function, and IP based MultiMedia Subsystem SIM (ISIM or IMS SIM) function.

* * * * *